(12) United States Patent
Coleiro

(10) Patent No.: US 6,468,007 B2
(45) Date of Patent: Oct. 22, 2002

(54) HINGE JIG

(76) Inventor: Mark A. Coleiro, 744 Riverside Drive, Ajax, Ontario (CA), L1T 3S2

(*) Notice: Subject to any disclaimer, the term of this patent is extended or adjusted under 35 U.S.C. 154(b) by 83 days.

(21) Appl. No.: 09/771,276

(22) Filed: Jan. 26, 2001

(65) Prior Publication Data

US 2002/0106253 A1 Aug. 8, 2002

Related U.S. Application Data

(60) Provisional application No. 60/196,166, filed on Apr. 11, 2000.

(51) Int. Cl.[7] .................................................. B23B 49/00
(52) U.S. Cl. ............................. 408/115 R; 408/241 B
(58) Field of Search .............................. 408/3, 97, 103, 408/115 R, 115 B, 241 B

(56) References Cited

U.S. PATENT DOCUMENTS

| | | | | |
|---|---|---|---|---|
| 2,810,310 A | * | 10/1957 | Saunders | .................... 408/109 |
| 4,153,384 A | * | 5/1979 | Isaken | ......................... 144/92 |
| 4,923,340 A | * | 5/1990 | Hegedusch | ............. 408/115 R |
| 5,076,742 A | | 12/1991 | Lee et al. | |
| 5,954,461 A | * | 9/1999 | Lemieux | ................. 408/115 R |
| 6,077,001 A | | 6/2000 | Fetzer | |
| 6,283,685 B1 | * | 9/2001 | Lemieux | ................. 408/115 R |

* cited by examiner

*Primary Examiner*—Daniel W. Howell
(74) *Attorney, Agent, or Firm*—Greenwald & Basch LLP; Howard J. Greenwald

(57) ABSTRACT

A device for accurately aligning the screw holes for installation of hidden hinges is disclosed. The jig comprises a jig body having a handle portion and a template portion. The template portion has a center hole for positioning a hinge cup drill hole in a cabinet door and an upper and lower offset hole for locating hinge plate mounting screw drill holes in a cabinet wall. An upper moveable arm is attached to the top end and a lower moveable arm is attached to the bottom end of the handle portion. Stopping means are provided for aligning the template portion along a vertical edge of the cabinet door or the cabinet wall.

7 Claims, 5 Drawing Sheets

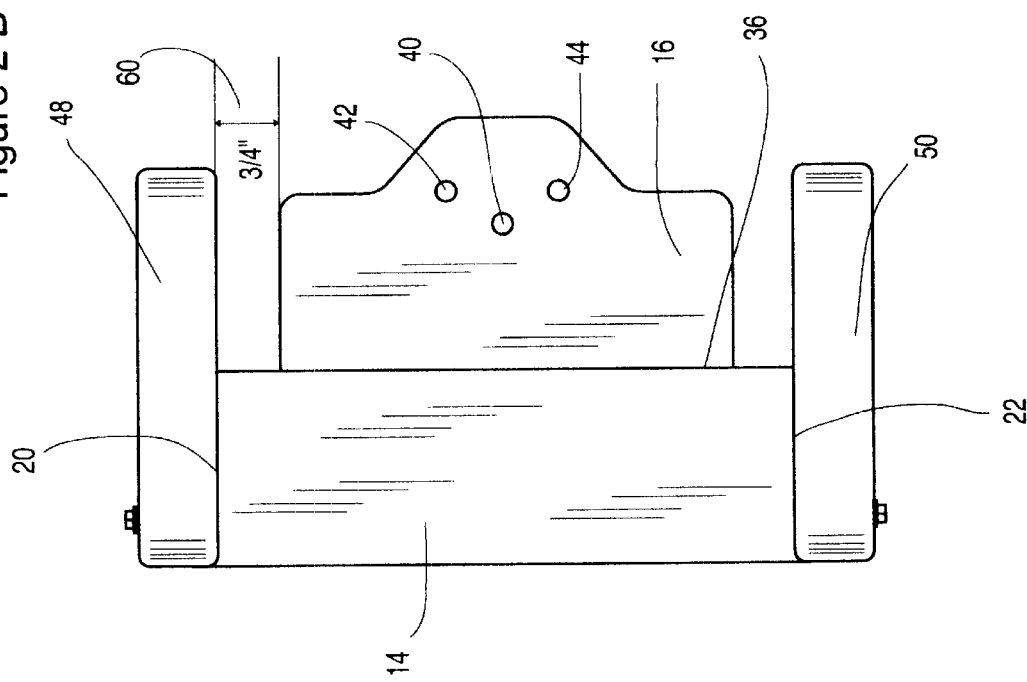
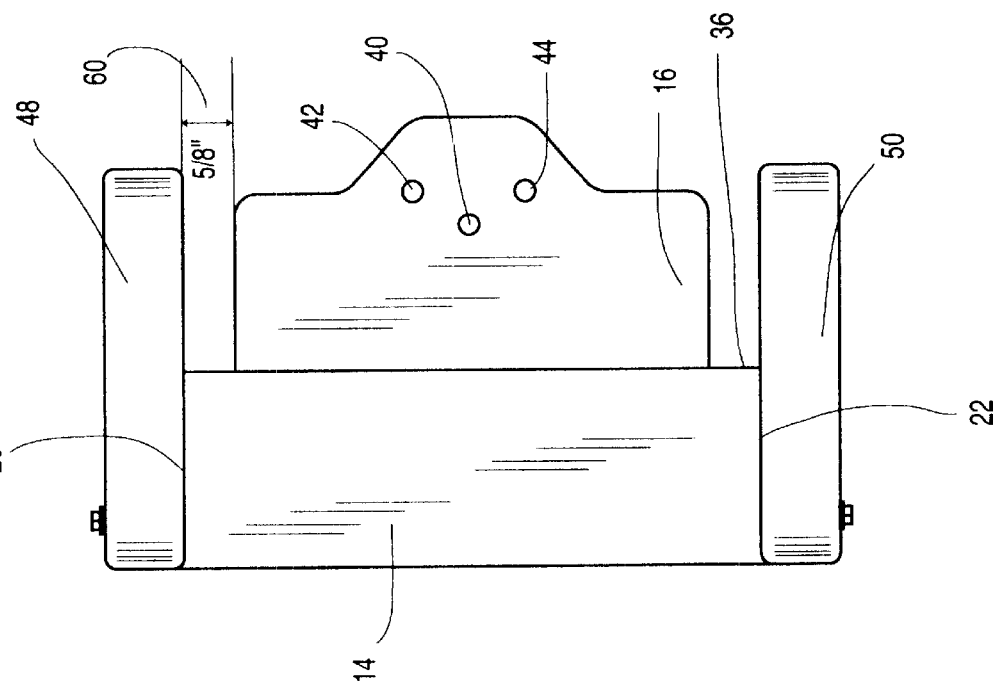

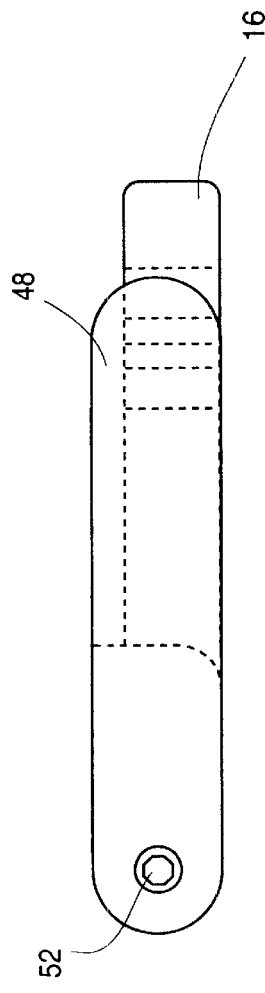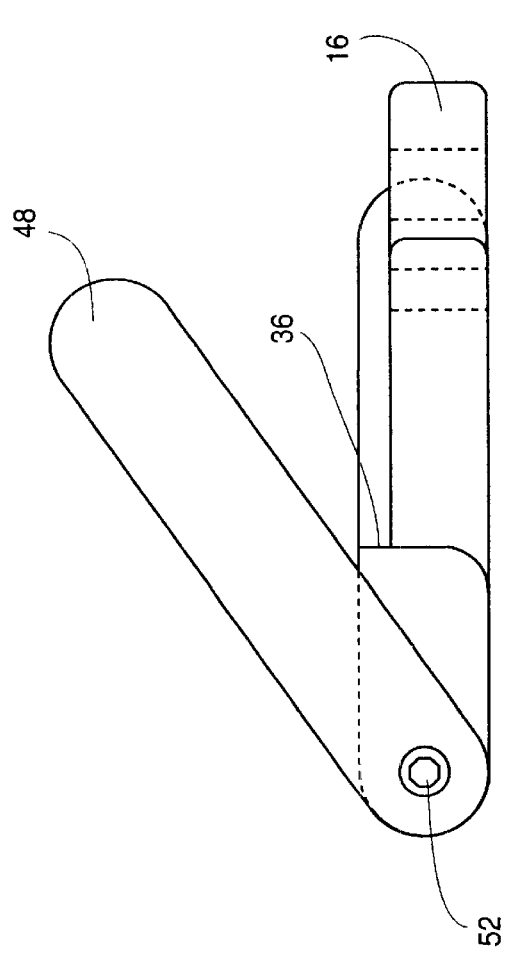

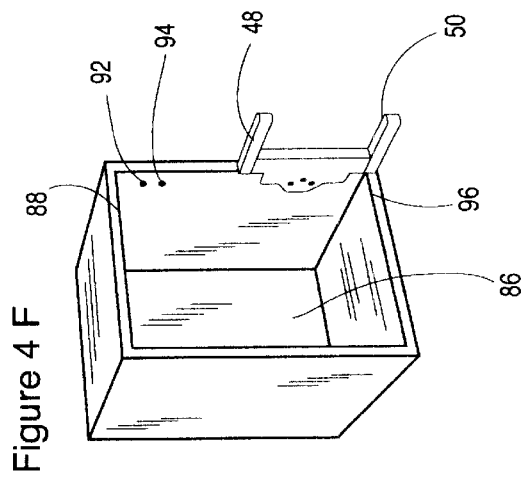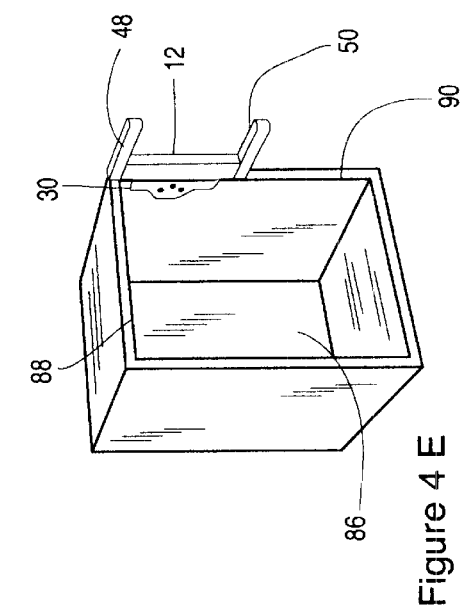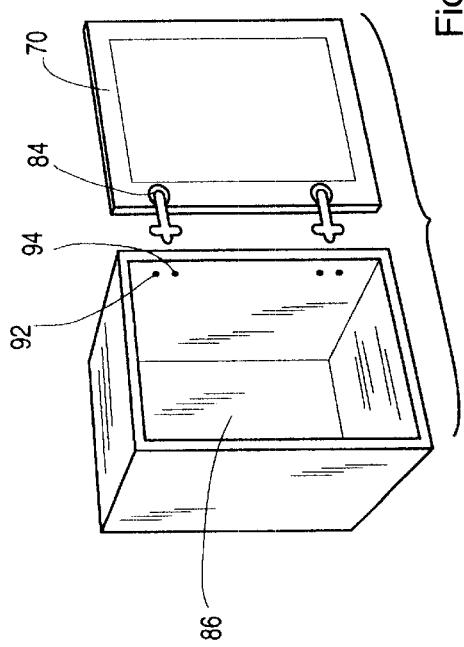

HINGE JIG

This application claims the benefit of provisional application No. 60/196,166, filed Apr. 11, 2000.

FIELD OF THE INVENTION

The present invention relates to the installation of hinges on cabinets and particularly to a jig for locating the screw holes necessary for the installation of hinges on European style cabinets.

BACKGROUND OF THE INVENTION

The accurate location of hinge components on cabinet and furniture doors is often time consuming and requires taking repeated measurements to ensure accurate alignment. Various types of devices have been developed as aids to help carpenters and home handymen to place precisely hinges on all types of doors.

The problem of accurate hinge component localisation is particularly important in the 32 millimeter cabinet making system. The 32 mm. cabinet system is also referred to as frameless construction since the hinges are mounted on the inside of the cabinet and are not seen on the face. The system was originally designed in Europe and cabinets mounted in this style are often referred to as "European" style cabinets.

The European style cabinet hinges typically comprise two components: the hinge plate and the hinge member cup. The hinge plate is mounted on the inside of the cabinet by two screws placed in holes previously drilled in the cabinet sidewall. The hinge member cup is recessed into the cabinet door. This requires a 35 mm. blind hole to be drilled into the door. Two screws also secure the hinge member cup in position. It is clearly apparent that the fit and finish of the cabinet depends upon the accurate positioning of each of the drill holes.

Previous attempts have been made to develop devices for the accurate alignment of European style hinges. U.S. Pat. No. 5,076,742, for example, is directed to a hinge drilling jig for use in the 32 mm. system of cabinet construction. While this device is useful for ensuring alignment of the hinge plate screw holes and the hinge member cup hole, use of the device involves repeatedly adjusting a number of sliding members for each door hinge which can be time consuming.

U.S. Pat. No. 6,077,001 is also directed to a device for mounting hinges. However, this device is highly engineered and is more applicable to industrial settings than on-site installations.

Thus there remains a real and unmet need for a device to accurately position hinges on European cabinets that is compact and easily adjustable for use on-site by both professional cabinet makers and the home handyman.

SUMMARY OF THE INVENTION

The present invention addresses the problem of accurate and rapid alignment of hinge components for installation on, for example, frameless or European style cabinets.

In one aspect of the invention, there is provided a hinge jig for accurately positioning drill holes for mounting hinges on cabinets. The jig comprises:

i) a jig body having
 a) a handle portion
 b) a template portion adjoined to said handle portion having a center hole for positioning a hinge cup drill hole in a cabinet door and an upper and lower offset hole for locating hinge plate mounting screw drill holes in a cabinet wall;

ii) an upper moveable arm attached to the top end and a lower moveable arm attached to the bottom end of said handle portion; and iii) a stop for aligning said template portion along a vertical edge of said cabinet door or said cabinet wall.

BRIEF DESCRIPTION OF THE DRAWINGS

Preferred embodiments will be described with respect to the accompanying drawings in which like numerals denote like throughout and in which:

FIGS. 2a and 2b are top views of the jig;

FIGS. 3a and 3b are front views of two embodiments of the jig; and

DETAILED DESCRIPTION

The installation of European style hinges on cabinets requires the careful alignment of a number of screw drill holes for the fastening or mounting of hinge components in place. This can be a time-consuming operation and, if not properly done, can result in damaged or wasted cabinet components. The present invention provides a universal jig which incorporates pre-set standardised measurements for the drilling of holes on both doors and cabinets for mounting European style hinges. The jig of the present invention overcomes the difficulties of measuring vertical and horizontal distances to find the cross center point to drill a 35 mm. cup blind hole for European hinges on cabinet doors and it ensures accuracy and reduces the time spent measuring. This enables any installer, whether professional or the home handyman, to accurately hangs doors on European style cabinets much more rapidly than otherwise possible. The jig's compact size and light weight allows it to be easily carried in a carpenter's toolbox.

Figure 1:
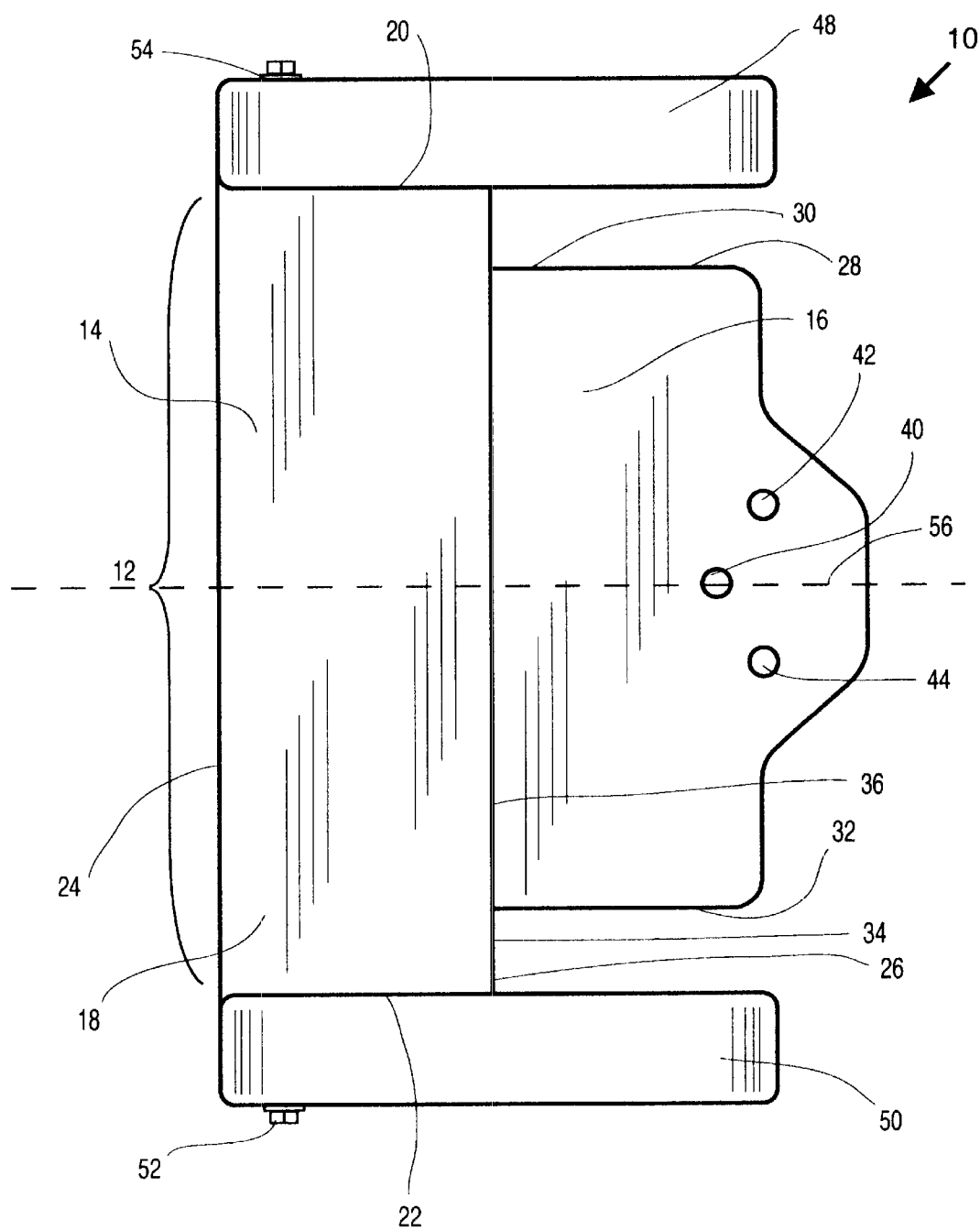
FIG. 1 is a front view of the jig of present invention.

In one aspect of the invention there is provided a jig as illustrated in FIG. 1. The jig 10 comprises a jig body 12 which has a handle portion 14 and a template portion 16. The handle portion 14 has a front face 18, a back face (not seen in FIG. 1), a top end 20 and a bottom end 22. The handle portion 14 also has an outer side edge 24 and an inner side edge 26. The template portion 16 abuts the handle portion 14 along the inner side edge 26. Because the template portion 16 is smaller than the handle portion 14, ledges are formed. The upper end 28 of the template portion 16 forms an upper ledge 30 and the lower end 32 of the template 16 forms a lower ledge 34. A longitudinal face ledge 36 is also formed.

The template portion 16 of the jig comprises holes for aligning or centering a drill for drilling holes to receive the hinge screws. In a preferred embodiment, the template portion 16 comprises a central hole 40 for locating the drill for the hinge cup in a cabinet door and a pair of offset holes 42, 44 for locating the drill for making the screw holes for the hinge plate on the interior of the cabinet.

Upper and lower moveable arms 48, 50 respectively, are attached to the ends 22, 24 of the handle portion 14 by thread screws 52 and held firmly in position by a washer 54. Each of the arms 48, 50 can be moved separately as needed.

As shown in FIG. 1 the top half of the jig and the bottom half of the jig are mirror images of each other about an axis 56. This allows for the rapid positioning of the hinge cup and screw holes at the same distance from the top and and the bottom of the cabinet.

As shown in FIGS. 2a and 2b, the distance 60 between the arms 48, 50 and ledges 30, 34 can be adjusted depending on the type of cabinet being used. For example, a jig for ⅝ in. cabinet would have a distance of ⅝ in. and a jig for a ¾ in. cabinet would have a distance of ¾ in. It is clearly apparent that the distance could be varied to accommodate other cabinet types.

The jig can be injection molded from any type of plastic that is rigid and durable. The jig can also be made from other materials such as light weight metals, like aluminum.

FIGS. 3a and 3b are top views of the jig. In FIG. 3a, the arm 48 is aligned with the top end 20 of the handle portion 14 and in FIG. 3b, the arm 48 has been rotated slightly. In this view the front face ledge 36 can be more clearly seen.

Figure 4:
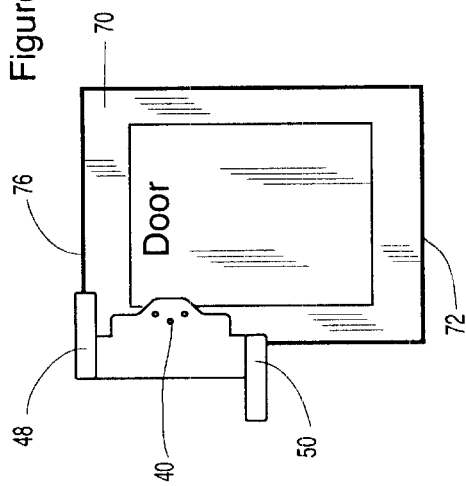
FIGS. 4a, 4b, 4c, 4d, 4e, 4f, and 4g illustrate how the jig is used to align the hinge components.
Figure 4:
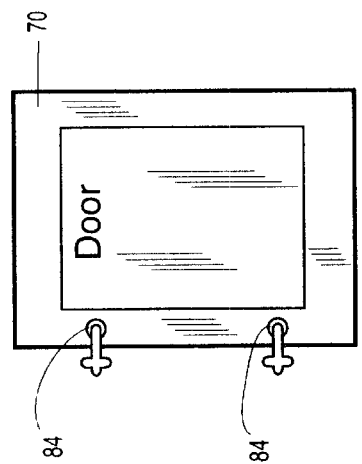
Figure 4:
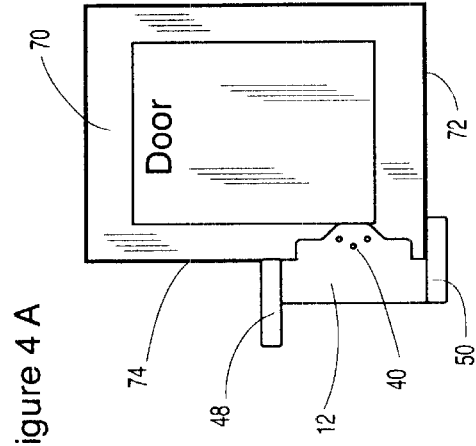
Figure 4:
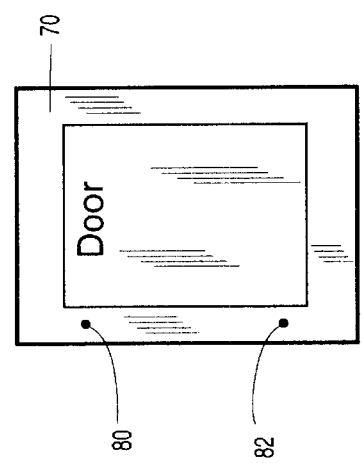

The use of the jig is illustrated in FIGS. 4a through 4g. The first step is to mark the hole for the first hinge cup in a typical cabinet door 70 as shown in FIG. 4a. The upper arm 48 is rotated so that it extends rearwardly of the jig body 12. The lower arm 50 is aligned along the bottom 72 of the cabinet door to position the center hole 40 at the correct (vertical) distance from the bottom of the door. The longitudinal ledge 36 is held in abutment against the edge 74 of the door to position the center hole 40 at the correct (horizontal) distance from the side of the door. In this way, both the horizontal and the vertical positioning can be achieved in a single step without any need to measure distances. Any appropriate center punch can be used in the hole to mark the position.

The process is essentially repeated, as illustrated in FIG. 4b, to mark the position for the second hinge cup. In this case, the upper arm 48 is used the align the template vertically by abutting the top 76 of the door and the lower arm 50 is rotated rearwardly. The longitudinal ledge 36 again ensures the appropriate horizontal alignment. The position for the upper hinge cup is then marked.

Once the upper 80 and lower 82 positions are marked as shown in FIG. 4c, a blind hole is prepared for installation of the hinge cup 84. In a preferred embodiment, a 35 mm hole, ½ inch deep hole is drilled and the hinge door component, or hinge cup, is installed.

The positioning of the cabinet component, or hinge plate, can also be rapidly marked using the jig of the present invention. To position the offset holes for alignment of the top hinge plate, the arms 48, 50 of the jig are rotated rearwards and the jig is aligned along the edge of a typical cabinet 86. The jig is moved upwards until the upper ledge 30 contacts the top interior edge 88 of the cabinet 86. This positions the offset holes vertically. The longitudinal ledge 36 is abutted against the side edge 90 of the cabinet to position the offset holes horizontally. Once the jig is firmly in position, the position of the screw holes 92,94 can be marked.

The lower hinge plate screw holes are marked in a similar way. Again the arms 48, 50 are rotated backwards. The longitudinal ledge 36 abuts the side edge 90 of the cabinet and the lower ledge 34 is then brought into contact with the interior bottom edge 96 of the cabinet. Once the jig is firmly in position and the screw holes are marked vertically and horizontally, the lower hinge plate can be installed.

In another embodiment, the jig body may be formed of a single piece in which the longitudinal face ledge is eliminated. In the case the moveable arms 48, 50 are designed to have a particular length so that when the arm is rotated rearward, one end of the arm terminates at the inner side of the handle portion and thereby forms a stop which functions in the same way as the longitudinal ledge by abutting the side of the door or cabinet.

By using the jig of the present invention, when all the hinge components are installed and assembled together, the tops and bottoms of the doors and the cabinets are precisely parallel with the tops and bottoms of the cabinets. This surprising result can be achieved by the design of the jig whereby the top half and bottom half of the jig are mirror images of each other. One arm can be used to align one end and then it is moved out of the way and the other arm is used to align the other end. Likewise the template can be easily flipped from one position for aligning the cup hole in the door to the reverse position for aligning the screw holes in the cabinet wall.

The above described jig provides for the accurate marking of positioning drill holes on both the cabinet and the door in a few simple steps and eliminates the need for extensive measuring in various directions.

While preferred embodiments of the invention have been described with respect the drawings, it is understood that variations may be made thereto without departing from the spirit of the invention or the scope of the appended claims.

I claim:

1. A hinge jig for accurately positioning drill holes for mounting hinges on cabinets, said jig comprising:
   i) a jig body having
      a) a handle portion
      b) a template portion adjoined to said handle portion having a center hole for positioning a hinge cup drill hole in a cabinet door and an upper and lower offset hole for locating hinge plate mounting screw drill holes in a cabinet wall;
   ii) an upper moveable arm attached to the top end and a lower moveable arm attached to the bottom end of said handle portion; and
   iii) a stop for aligning said template portion along a vertical edge of said cabinet door or said cabinet wall.

2. The jig of claim 1 wherein said handle portion has a front face and a rear face, a top end and a bottom end, an outer side edge and an inner side edge and said template portion is adjoined to said handle portion along said inner side edge and thereby forming a top ledge, a bottom ledge and at least one longitudinal face ledge whereby said longitudinal face ledge acts as said stop for alignment of said template portion.

3. The jig of claim 1 wherein said upper arm and said lower arm are used to position the template portion at the top and bottom, respectively, of the cabinet door or cabinet wall.

4. The hinge jig of claim 2, wherein said top ledge is formed ⅝ inch from the top end of the handle portion.

5. The hinge jig of claim 2, wherein said top ledge is formed ¾ inch from the top end of the handle portion.

6. The hinge jig of claim 1, wherein said jig body is manufactured from plastic.

7. The hinge jig of claim 1, wherein said jig body is manufactured from a light weight metal.

* * * * *